United States Patent
Dunne et al.

(10) Patent No.: US 7,362,811 B2
(45) Date of Patent: Apr. 22, 2008

(54) AUDIO ENHANCEMENT COMMUNICATION TECHNIQUES

(75) Inventors: Bruce E. Dunne, Niles, MI (US); Ravi Chandran, South Bend, IN (US); Daniel J. Marchok, Buchanan, MI (US)

(73) Assignee: Tellabs Operations, Inc., Naperville, IL (US)

( * ) Notice: Subject to any disclaimer, the term of this patent is extended or adjusted under 35 U.S.C. 154(b) by 0 days.

(21) Appl. No.: 11/602,837

(22) Filed: Nov. 21, 2006

(65) Prior Publication Data

US 2007/0064817 A1 Mar. 22, 2007

Related U.S. Application Data

(63) Continuation of application No. 10/075,145, filed on Feb. 14, 2002, now Pat. No. 7,158,572.

(51) Int. Cl.
*H04B 1/66* (2006.01)
(52) U.S. Cl. ........................................ 375/241
(58) Field of Classification Search ................ 375/240, 375/240.02, 240.23, 240.25, 241–242, 246, 375/253–254; 379/4, 88.07, 93.01, 93.08, 379/88.1; 370/543, 545
See application file for complete search history.

(56) References Cited

U.S. PATENT DOCUMENTS

| | | | |
|---|---|---|---|
| 4,283,770 A | 8/1981 | Stewart | |
| 5,881,104 A * | 3/1999 | Akahane | 375/240 |
| 5,896,449 A | 4/1999 | Oshidari et al. | |
| 6,125,120 A | 9/2000 | Lehtimaki | |
| 6,466,624 B1 | 10/2002 | Fogg | |
| 6,512,790 B1 | 1/2003 | Sourani | |
| 6,701,139 B1 | 3/2004 | Kushmaro et al. | |
| 6,785,330 B1 * | 8/2004 | Whealton et al. | 375/240.11 |
| 6,791,976 B2 | 9/2004 | Huh et al. | |
| 6,795,497 B1 | 9/2004 | Shalem | |
| 6,999,920 B1 * | 2/2006 | Matt et al. | 704/215 |

* cited by examiner

*Primary Examiner*—Khanh C. Tran
(74) *Attorney, Agent, or Firm*—Hamilton, Brook, Smith & Reynolds, P.C.

(57) ABSTRACT

A communication system (10) receives a communication signal comprising first and second data with different compression levels, such as highly compressed and weakly compressed levels. A mode detector (15) detects the level of compression. One or more signal decoders (20, 22) decode the highly compressed data. An analyzer (30) determines the type of enhancement required. One or more processors (48, 50, 80) enhance the data as required. An encoder (60) reencodes the enhanced decoded data. Metrics (90) may aid the operation of the analyzer (30).

The communication system may include telephones (120, 122, 124, 126). Processors (103, 104) enhance signals in opposite first and second directions between pairs of the telephones. A path (106) connects the processors in tandem. One or more switches (101, 102) disable signal enhancement for one of the processors depending on the compression level of the signals to avoid degrading call quality.

22 Claims, 6 Drawing Sheets

AUDIO ENHANCEMENT COMMUNICATION TECHNIQUES

RELATED APPLICATIONS

This application is a continuation of U.S. application Ser. No. 10/075,145, filed Feb. 14, 2002 now U.S. Pat. No. 7,158,572. The entire teachings of the above application are incorporated herein by reference.

BACKGROUND OF THE INVENTION

This invention relates to voice enhancement and more particularly relates to such enhancement utilizing highly compressed communication signals.

The growth of digital cellular telephones has increased the need for voice enhancement (VE) equipment. A number of products are currently on the market to improve speech quality, including echo cancellers and voice band enhancement (VBE) products, such as acoustic coupling elimination (ACE), noise reduction (NR) and automatic level control (ALC). Products like these are referred to as audio enhancement (AE) products.

When tandem-free operation (TFO) service becomes available, it will no longer be possible to employ these VBE products in the traditional manner. The current known VBE products are designed to process weakly compressed speech data. In TFO, speech is encoded into highly compressed data using various speech compression methods such as those specified in the global system for mobile communications (GSM) standards. The highly compressed speech data are transmitted through the network and are decoded only at the receiver. To apply these products to highly compressed data in the TFO environment requires additional functionality in the network.

To further differentiate between highly compressed data and weakly compressed data, the following definitions are given. Highly compressed data are data whose bit rate is significantly smaller than the bit rate at which it was originally digitized. Such high levels of compression are usually achieved by considering multiple samples of a signal to generate a small number of parameters representing the samples, and involves significant computational expense. Examples of highly compressed data include those compressed using linear predictive coding (LPC) methods, code-excited linear prediction (CELP) methods and multiband excitation (MBE) coding methods. For example, speech data compressed using one of the following standards is considered highly compressed: GSM HR, GSM FR, GSM EFR, GSM AMR and G.728. Thus, highly compressed data includes a range of compression levels (hereafter a "highly compressed range").

Weakly compressed data are data that include uncompressed digitized audio signals as well as compression schemes that are relatively computationally inexpensive. An example is the G.711 Pulse Code Modulation (PCM) standard. G.711 PCM is a companding scheme used to convert between a 13-bit linear sample and an 8-bit PCM sample. Because of the relationship between the 13-bit and 8-bit samples, the 13-bit samples are also often referred to as linear PCM samples. In the case of the TFO standard, the upper 6 bits of each sample correspond to a PCM code and will be considered as weakly compressed data, while the lower 2 bits correspond to highly compressed data. Thus, the weakly compressed data include a range of compression levels (hereafter a "weakly compressed range") with less compression than the highly compressed range. Weakly compressed data sometimes are referred to as linear domain signals or data.

The addition of VBE functionality to highly compressed data is a problem which currently confronts the communications industry. Simply adding a decode process on highly compressed data before linear domain (VBE) features and then re-encoding can degrade speech quality. Another approach might be to perform speech enhancements on highly compressed data. However, the enhancement algorithms for the highly compressed data are in their early stages of development and cannot always perform as well as linear domain techniques. The present invention provides the additional functionality needed without the disadvantages of the approaches described above.

One technique for enhancing telephone signals is shown in U.S. Pat. No. 4,283,770 (Stewart, issued Aug. 11, 1981) which describes a processor for multiplying two A-law digitally encoded factors in a manner which produces a product which is a precise linear representation of the product of the linear equivalents of the two factors. Although the Stewart techniques provides some enhancement of telephone signals, it does not teach how to handle TFO service signals for voice enhancement.

BRIEF SUMMARY OF THE INVENTION

A first embodiment of the invention is useful in a communication system arranged to receive a communication signal comprising first data compressed at a compression level within a first range of compression levels and second data compressed at a compression level within a second range of compression levels, the first range of compression levels being greater than the second range of compression levels. The communication signal is transmitted on a communication channel. In such an environment, the quality of the communication signal may be enhanced by generating a first mode signal in response to the first data and by generating a second mode signal in response to the second data. The generating may be accomplished by a mode detector. Decoded first data having a compression level less than the first range of compression levels is generated in response to the first mode signal, preferably by one or more decoders. A first analyzer signal is generated in the event that the first data is deemed suitable for a first type of enhancement in response to the first mode signal and the decoded first data. A second analyzer signal is generated in the event that the first data is deemed suitable for a second type of enhancement in response to the first mode signal and the decoded first data. A third analyzer signal is generated in the event that the second data is deemed suitable for a third type of enhancement in response to the second mode signal and second data. A fourth analyzer signal is generated in the event that the second data is deemed suitable for a fourth type of enhancement in response to the second mode signal and second data. The analyzer signals preferably are generated with a signal analyzer. Enhanced decoded first data enhanced with the first type of enhancement is generated in response to the first analyzer signal and the decoded first data. Enhanced first data enhanced with the second type of enhancement is generated in response to the second analyzer signal and the first data. Enhanced second data enhanced with the third type of enhancement is generated in response to the third analyzer signal and the second data. Enhanced second data enhanced with the fourth type of enhancement is generated in response to the fourth analyzer signal and the second data. The enhanced data preferably is generated by one or more processors. The enhanced decoded first data is encoded to form encoded enhanced first data having a compression level within the first range of compression levels, preferably by an encoder.

A second embodiment of the invention also is useful in a communication system arranged to receive a communication signal comprising first data compressed at a compression level within a first range of compression levels and second data compressed at a compression level within a second range of compression levels. The first range of compression levels is greater than the second range of compression levels, and the communication signal is transmitted on a communication channel. In such an environment, the quality of the communication signal is enhanced by providing apparatus comprising means for generating a first mode signal in response to the first data and for generating a second mode signal in response to the second data means for generating decoded first data having a compression level less than the first range of compression levels in response to the first mode signal also is provided. The apparatus further comprises means for generating a first analyzer signal in the event that the first data is deemed suitable for a first type of enhancement in response to the first mode signal and the decoded first data, for generating a second analyzer signal in the event that the first data is deemed suitable for a second type of enhancement in response to the first mode signal and the decoded first data, for generating a third analyzer signal in the event that the second data is deemed suitable for a third type of enhancement in response to the second mode signal and second data and for generating a fourth analyzer signal in the event that the second data is deemed suitable for a fourth type of enhancement in response to the second mode signal and second data. The apparatus further comprises means for generating enhanced decoded first data enhanced with the first type of enhancement in response to the first analyzer signal and the decoded first data, for generating enhanced first data enhanced with the second type of enhancement in response to the second analyzer signal and the first data, for generating enhanced second data enhanced with the third type of enhancement in response to the third analyzer signal and the second data, for generating enhanced second data enhanced with the fourth type of enhancement in response to the fourth analyzer signal and the second data. In addition, the apparatus comprises means for encoding the enhanced decoded first data to form encoded enhanced first data having a compression level within the first range of compression levels.

Another embodiment of the invention is useful in a communication system comprising a first telephone and a second telephone. Communication is enabled by signals transmitted between the first telephone and second telephone in a first direction and in a second direction opposite the first direction. In such an environment, communication is improved by enhancing the signals transmitted in the first direction and the second direction, by disabling a portion of the enhancing for the signals transmitted in the first direction and by disabling a portion of the enhancing for the signals transmitted in the second direction in the event that the signals comprise data at a predetermined compression level. The enhancing may be performed by means for enhancing, such as one or more processors. The disabling may be performed by means for disabling, such as one or more processors.

Another embodiment of the invention comprises a computer readable medium encoded with a computer program executable to perform various forms of functionality. For example, the functionality may comprise generating a first mode signal in response to first data of a communication signal. The first data is compressed at a compression level within a first range of compression levels. A second mode signal is generated in response to the second data of the communication signal. The second data is compressed at a compression level within a second range of compression levels, and the first range of compression levels is greater than the second range of compression levels. Decoded first data having a compression level less than the first range of compression levels is generated in response to the first mode signal. A first analyzer signal is generated in the event that the first data is deemed suitable for a first type of enhancement in response to the first mode signal and the decoded first data. A second analyzer signal is generated in the event that the first data is deemed suitable for a second type of enhancement in response to the first mode signal and the decoded first data. A third analyzer signal is generated in the event that the second data is deemed suitable for a third type of enhancement in response to the second mode signal and second data. A fourth analyzer signal is generated in the event that the second data is deemed suitable for a fourth type of enhancement in response to the second mode signal and second data. Enhanced decoded first data enhanced with the first type of enhancement is generated in response to the first analyzer signal and the decoded first data. Enhanced first data enhanced with the second type of enhancement is generated in response to the second analyzer signal and the first data. Enhanced second data enhanced with the third type of enhancement is generated in response to the third analyzer signal and the second data. Enhanced second data enhanced with the fourth type of enhancement is generated in response to the fourth analyzer signal and the second data, and the enhanced decoded first data is encoded to form encoded enhanced first data having a compression level within the first range of compression levels.

By using the foregoing techniques, service providers can take advantage of TFO communication without sacrificing voice quality in the cases where audio enhancements are necessary. Furthermore, in cases where it is determined that audio enhancements are not necessary, the loss of speech quality due to tandem codecs is avoided.

DESCRIPTION OF THE PREFERRED EMBODIMENTS

Figure 1:
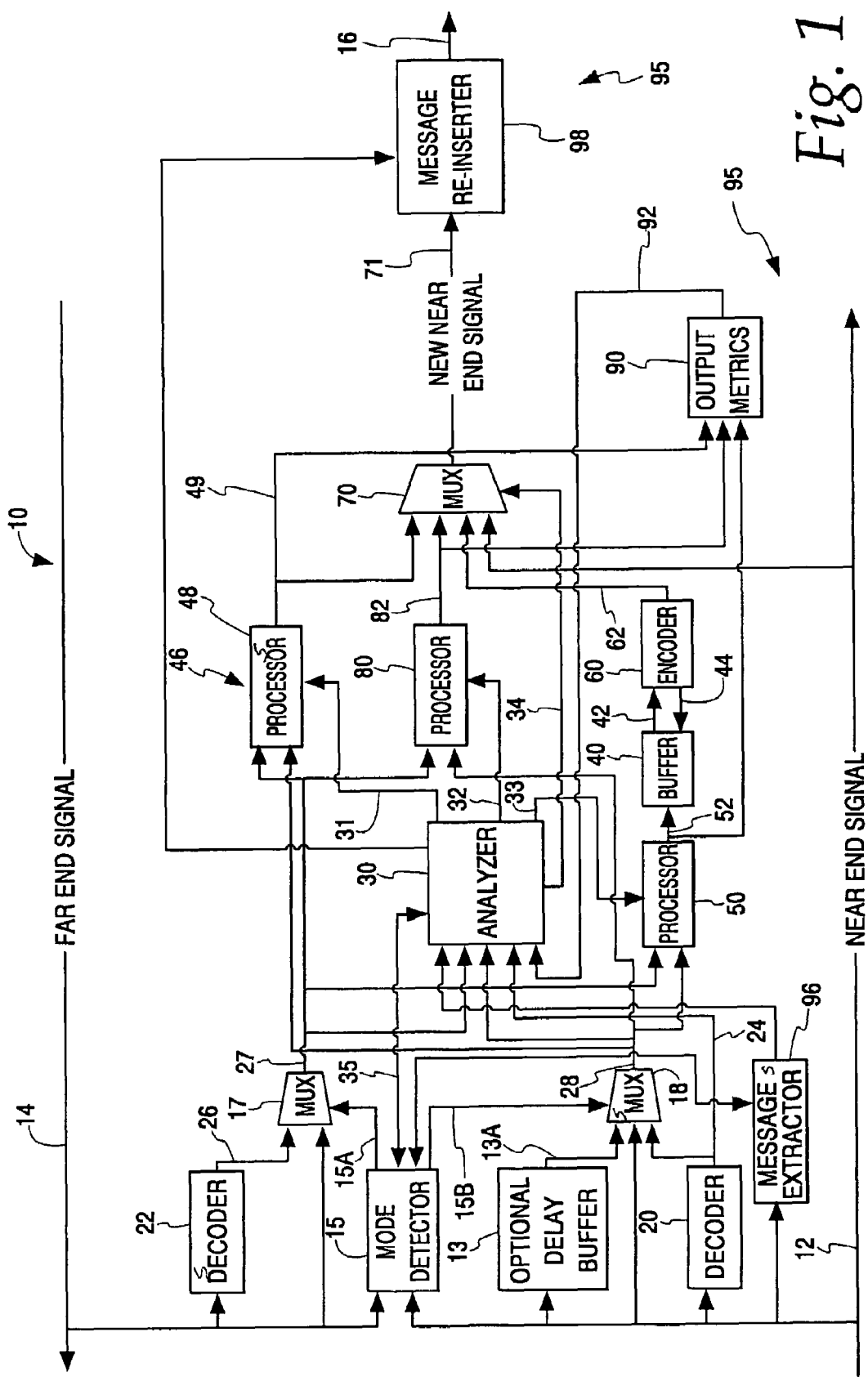
FIG. 1 is a functional block diagram of a preferred form of the present invention.

With the development of tandem-free operation (TFO) into the telephone network, an issue exists as to how to provide audio enhancements (such as level control, noise reduction and echo control) to highly compressed domain signals without suffering audio degradation due to additional vocoding stages (i.e., voice coder stages that compress data). The solution, which the preferred embodiment addresses, is to trade-off the expected enhancement of the audio feature against the detriment of the additional vocoder stage. The preferred embodiment describes a system which is responsive to both the weakly compressed and highly compressed data. This system can further determine the type of audio enhancement that is best suited to that data, and then provides that enhancement to the data. The format of the egress data matches that of the ingress and may have undergone linear AE processing, coded domain processing or none. (Note that linear AE processing applied to highly compressed data requires a decoder conversion to weakly compressed data, then the AE processing is applied, followed by a conversion back to the highly compressed data domain.) Several types of metrics are generated in order to determine the best type of audio enhancement to apply to the incoming data.

The preferred embodiment of the invention adds to a conventional system the ability to decode highly compressed speech data, enhance the decoded data with a VBE function and then re-encode the enhanced data to allow further highly compressed format transmission. This extra decoding and encoding could reduce the benefits associated with the TFO service if it were allowed to increase delay or degrade signal quality unnecessarily. Hence, we have developed a sophisticated system that only enables this extra decoding and encoding when linear domain VBE functions result in superior overall signal quality in comparison to the case of not enabling the VBE features. (Linear VBE processing refers to the usual VBE processing normally performed in the time and/or frequency domain on weakly compressed data.) This functionality is further extended to the native mode application, where VBE functionality is added to highly compressed data. By "native mode" or "native" VBE processing, we mean VBE processing performed directly on-the highly compressed data parameters, rather than on weakly compressed parameters or linear data parameters, while the highly compressed data remains in the highly compressed range. By correctly analyzing the highly compressed domain speech communication data, the best feature combinations are enabled on a real time basis, and the best of class algorithms are employed under widely varying network and environmental conditions. The preferred embodiment describes methods and apparatus for determining the point at which to enable the VBE features in a TFO environment and methods and apparatus for handling the delay inherent in the requisite decoding and encoding.

When a telephone call originates and terminates with digital cellular mobile subscribers (a mobile-to-mobile call), the data can be transmitted through the network with the highly compressed data used with TFO networks. Decoding the highly compressed data into weakly compressed PCM data and then re-encoding the PCM data into highly compressed data adds delay and expense, and can degrade the signal quality resulting from the data. In addition, this transformation makes inefficient use of bandwidth. For Full Rate (FR) GSM transmission, the data transmission rate is 16 kbps (assuming about 12.2 kbps for the coded data with additional framing and messaging overhead) as opposed to 64 kbps for PCM. Maintaining the highly compressed domain digital format of TFO networks allows up to a 4:1 increase in transmission bandwidth efficiency.

Although TFO networks increase efficiency, they impede the enhancement of call quality. This invention solves this problem by providing techniques to enable the VBE features as needed and minimizing delay artifacts.

According to one embodiment of the invention, certain metrics or characteristics of the highly compressed data are measured via an off-line decoder and analyzer, and these metrics or characteristics are used to enable or disable the audio enhancement.

There are two types of audio enhancement (AE) available. The first is the traditional AE which operates on the weakly compressed speech data. AE features are utilized serially through a decode, AE process and re-encode stage. Novel techniques are employed to minimize delay issues. This approach allows existing, approved algorithms to be directly implemented.

The second type of AE enhancement is the native mode AE. Native mode AE algorithms modify the highly compressed domain data parameters directly without requiring decoding and reencoding, and minimal delay is encountered. In native mode AE, the highly compressed data are enhanced while they remain within the highly compressed range of compression levels. These algorithms are not as evolved as the linear or weakly compressed data routines and hence are not as generally applicable. An analyzer is used to determine if native mode AE processing is appropriate.

Referring to FIG. 1, one form of the present invention is useful in connection with a cellular telephone communication system 10 employing conventional communication paths or channels 12 and 14 each of which may transmit a communication signal comprising highly compressed digital data during one mode of operation, and may transmit weakly compressed digital data, such as PCM data, during another mode of operation. It also is possible for highly compressed data to be present on channel 12 while weakly compressed data are present on channel 14 and vice versa. Channel 12 transmits a near end encoded signal and channel 14 transmits a far end encoded signal. These signals may comprise, for example, a conventional telephone conversation in which the speech of one party results in the near end encoded data and the speech of the other party results in the far end encoded data. The system also includes another communication channel 16 which may be considered a continuation of channel 12 in that channel 16 carries a possibly enhanced signal resulting from the encoded data received on channel 12.

In a system such as communication system 10, one form of the present invention basically comprises an optional delay buffer 13, a mode detector 15 associated with switches 17 and 18, signal decoders 20 and 22, an analyzer 30, a buffer memory 40, an enhancement processor 46 comprising enhancement processor functions 48 and 50 and a native mode processor function 80, an encoder 60, a switch 70 and an output metrics function 90.

Mode detector 15 monitors at least one and preferably both the far end and near end signals on channels 12 and 14 to determine if the data embodied in the signals are weakly compressed (e.g., PCM signals) or are highly compressed. Both highly compressed and weakly compressed data may occur in the same system. Mode detector 15 preferably determines which is present by monitoring inband messages and searching for the presence of framing patterns. Alternatively, mode detector 15 may make the determination in concert with a message extractor 96 (FIG. 1). The inband messages are used by the far end and near end signals to negotiate into the highly compressed range. The presence of the framing pattern in the signal indicates that the highly compressed range has been achieved. (For example, the TFO messages and framing patterns used by GSM are explained in the ETSI standard GSM 08.62 "Digital cellular telecommunications system (Phase 2+); Inband Tandem Free Operation (TFO) of Speech Codecs"). Likewise, absence of this framing pattern indicates that the data is weakly compressed. Mode detector 15 also may include additional capabilities of detecting the type of weakly compressed data, e.g., whether the data is tone data (e.g., DTMF), communication data (e.g., speech data), or signaling type data (e.g., idle code). If the weakly compressed data does not fall into one of the foregoing categories, it is assumed to be a weakly compressed speech data (e.g., PCM speech data). The weakly compressed data detectors are commonly found in a wide range of products, including modulated data detection and idle code detection sub-systems of the Tellabs EC3300 Echo Canceller module. Tone detection algorithms can be found in the standard communication handbooks. Such a mode detector comprises functions such as a DTMF detector as described in "DTMF Tone Generation and Detection: An Implementation," (TMS320C54x Application Report, 1997, Texas Instruments).

Mode detector 15 in combination with analyzer 30 enables and disables the various processor functions which form processor 46. If mode detector 15 detects highly compressed data on either channel 12 or 14, it transmits a first mode signal which disables processor function 48, enables processor functions 50 and 80 and enables decoders 20 and 22 to generate decoded data. If mode detector 15 detects weakly compressed data, it generates and transmits to analyzer 30 a second mode signal which in turn enables processor function 48, disables processor functions 50 and 80 and bypasses decoders 20 and 22. The additional capabilities of mode detector 15 preferably are used to control the enabling of processor function 48. If the detected data is weakly compressed, but is not speech data, processor function 48 is bypassed via control of switch 70 by analyzer 30 (e.g., the near end signal on channel 12 is not affected by processor function 48). Processor functions 48 and 50 are typically identical. However, processor function 48 does not require pre-decoding and post-encoding and associated buffer management.

Analyzer 30 responds to certain predetermined characteristics (or metrics) of the data on paths 27 and 28 to generate various analyzer signals in the event that the data on one or more of the paths are suitable for enhancement. Both data on paths 27 and 28 may be highly compressed data (i.e., highly compressed communication signals from channels 12 and 14) or both may be weakly compressed decoded data from one of decoders 20 and 22. Alternatively, the signal on path 27 may be highly compressed data while the signal on path 28 is weakly compressed decoded data and vice versa. Analyzer 30 may conduct analysis in response to communication data in their highly compressed undecoded states alone or may conduct analysis in response to one or more decoded communication data by first decoding one or both of the communication data through decoder 20 and/or decoder 22. The predetermined characteristics analyzed by analyzer 30 include one or more of long-term power, short-term power, double talk, spectral content, noise power, signal power, echo return loss, pitch, signal to noise ratio and other standard measures. In addition, the output metrics 90 gathers the output of processors 48, 50 and 80 (whichever are enabled), and represents the benefits of enhancement that would be delivered by the addition of the AE processing. For example, output metrics 90 may receive the enhanced decoded data received from processor 50 and the enhanced data received from processor 80. The result of this possible enhancement is relayed back to analyzer 30 by path 92 to be used as a further metric by analyzer 30. The output metrics gathered by 90 are used to further determine the suitability of the signal for enhancement by quantifying the actual amount of the deliverable enhancement.

Assuming mode detector 15 detects weakly compressed data (e.g., PCM data) on channel 12, decoder function 20 is bypassed via the action of switch 18 as controlled by mode detector 15 via a control path 15B, and the PCM data is routed directly to the analyzer 30 and processor 48. Optionally, the data on channel 12 is first routed and delayed through the optional delay buffer 13. Mode detector 15 (under the direction of analyzer 30) directs switch 18 over control path 15B to accept the output 13A of optional delay buffer 13 during certain processing periods as explained below. This option can be provided to allow improved transparency in the transitioning of the various modes as the near end signal on channel 12 either changes its compression type or the various processing functions are switched in or out. The amount of delay inserted into the signal prior to processing is typically chosen to be the delay encountered when employing processor 50. Therefore, if the signal transitions from native VBE processing (e.g., generating enhanced highly compressed data by processor 80) with the optional delay buffer 13 active to linear VBE processing (e.g., generating enhanced decoded data by processor 50) with the delay buffer inactive, the delay through system 10 remains substantially the same. As the processed data from native mode processor 80 runs out, linear VBE processed data from processor 50 becomes available.

Assuming mode detector 15 detects weakly compressed data on channel 14, decoder 22 is bypassed via the action of switch 17 as controlled by mode detector 15 over a control path 15A. The data on channel 14 is passed directly to analyzer 30 and the processor complex 46. In the event that mode detector 15 detects highly compressed data on channel 14, decoder 22 is used to decode the signal on channel 14. The decoder output 26 is routed through switch 17 via the actions of mode detector 15 over control path 15A. This decoded data is then passed to analyzer 30 and processor complex 46. In addition, the highly compressed data may also be passed to the analyzer and processor complex 46.

In the case where detector 15 detects weakly compressed data on channel 12, a first mode signal is generated which causes processor function 48 to become active and causes enhanced weakly compressed data to be generated. If analyzer 30 determines that the data present on channel 12 is suitable for linear domain VBE processing, the data on path 49 is routed through switch 70, where switch 70 is controlled by analyzer 30 via a control signal on path 34, to the new near end signal on path 16.

Assuming detector 15 detects highly compressed data on channel 12, decoder 20 decodes the data on channel 12 into weakly compressed decoded data appearing on an output path 24, which is then routed to path 28 via the action of switch 18 as controlled by mode detector 15. This weakly compressed decoded data is used by analyzer 30 and is made available to the processor complex 46, including processor 50.

Alternatively, in certain cellular networks (such as the GSM TFO standard previously mentioned), an abbreviated version of the weakly compressed PCM data is concatenated with the highly compressed data. Normally, the PCM data is received as a series of 8-bit samples. For the GSM TFO system, the highly compressed data is multiplexed with the weakly compressed PCM data. The highly compressed data overwrites the 2 Least Significant Bits (LSB) of the 8-bit PCM sample. The remaining 6 Most Significant Bits (MSB) of the PCM sample are unmodified weakly compressed data. Therefore, in the GSM TFO application, if mode detector 15 detects highly compressed data on channel 12, alternatively this signal is passed to path 28 through switch 18 and on to analyzer 30 without being processed by decoder 20. Analyzer 30 uses the abbreviated version of the weakly compressed PCM data to determine if native mode enhancement or linear mode enhancement is preferred. If native mode enhancement is preferred, analyzer 30 generates a signal on path 32 that selects processor 80 and a signal on path 31 that selects processor 48. The highly compressed two LSB's are sent to processor 80 and the weakly compressed six bits are sent to processor 48. Processor 48 performs the same type of enhancement on processor 80.

The bits are segregated by the analyzer 30, with the highly compressed two bits sent to processor 80 and the lowly compressed 6 bits sent to processor 48. The analyzer 30 notifies processors 48 and 80 of the native domain TFO processing mode over paths 31 and 32, respectively. Over these same paths, analyzer 30 instructs processors 48 and 80 to apply the type and level of native domain enhancement that analyzer 30 has determined to be appropriate. The analyzer 30 signals MUX 70 over path 34 that processors 48 and 80 are processing in native domain TFO mode. The MUX 70 receives the enhanced signals from processors 48 and 80 over paths 49 and 82, respectively. MUX 70 then bit-wise multiplexes the two enhanced signals back into an enhanced TFO signal to be transmitted on channel 16.

The analyzer 30 instructs the mode detector 15 over path 35 that the decoded signal is required to be available for TFO linear mode processing. Mode detector 15 then signals MUX 18 over path 15B that the output of decoder 20 should be directed onto path 28. Processor 50 accesses the decoded signal on path 28. Analyzer 30 instructs processor 50 over path 33 to perform the desired enhancement. Following enhancement, the weakly compressed enhanced signal is encoded by the encoder 60. The processor 50, working with the buffer 40, multiplexes the upper 6 bits portion of the weakly compressed enhanced signal with the 2 bits associated with the enhanced highly compressed signal. The analyzer then instructs the MUX 70 over path 34 to route the signal on path 62 to the output channel 16.

In the event that analyzer 30 determines that the highly compressed data on path 12 is suitable for linear VBE enhancement, an output analyzer signal is generated on path 33 and is transmitted to processor function 50. Processor function 50 generates enhanced decoded data from the decoded data on path 28. Processor function 50 is capable of performing various types of voice band enhancement including echo suppression with noise injection, echo cancellation, noise reduction, adaptive noise cancellation, and automatic level control. The enhanced decoded data generated by processor function 50 is transmitted over a path 52 to a buffer 40. Encoder 60 encodes the buffered enhanced decoded signal to form highly compressed encoded enhanced data on path 62. The data on path 62 is transmitted to switch 70. Analyzer 30 configures switch 70 via a control signal on a path 34 to route the signal on path 62 to the new near end signal on channel 16.

Analyzer 30 generates an analyzer signal on path 32 in the event that the highly compressed data on channel 12 is deemed suitable for native mode enhancement. The analyzer 30 instructs the mode detector 15 over path 35 to configure switch 18 to pass the data on channel 12 directly (or through optional delay buffer 13 if so equipped) to path 28. Processor 80 then modifies the highly compressed data on path 28 directly. Note that the output of decoder 20 on path 24 is still available to analyzer 30 in order to extract metrics for continued decision processes as well as relay of information to processor 80 over path 32.

Native mode enhancement processor function 80 responds to the highly compressed domain data on channel 12 and the analyzer signal generated on path 32 in order to generate highly compressed enhanced encoded data on path 82 while the data being enhanced remains in the highly compressed range within processor function 80. The highly compressed data on channel 12 is decoded by decoder 20 to provide an input to the analyzer. Alternatively, the highly compressed data may be routed directly to analyzer 30 through switch 18. The data on path 82 is transmitted to switch 70. Switch 70 is controlled by analyzer 30 via the control data on path 34, where analyzer 30 configures switch 70 to route the data on path 82 to the new near end signal on channel 16.

In some cases, it is determined that the data present on channel 12 is deemed unsuitable for AE enhancement. This occurs when the mode detector has detected that the data is of type tone, data or signaling or that the metrics gathered by the analyzer indicate that an insufficient level of improvement in speech quality would be realized. In this case, analyzer 30 routes the data on channel 12 through switch 70 onto channel 16 via the control signal on path 34, thereby unaffecting the near end data on channel 12.

The apparatus illustrated in FIG. 1 can be implemented either by separate hardware circuits for each of the blocks or by a digital signal processor (DSP) or other type of microprocessor which executes program code for performing the functions described in connection with blocks 13, 15, 17, 18, 20, 22, 30, 40, 48, 50, 60, 70, 80, 90, 96 and 98. Combinations of hardware circuits and one or more DSPs also can be used.

Figure 6:
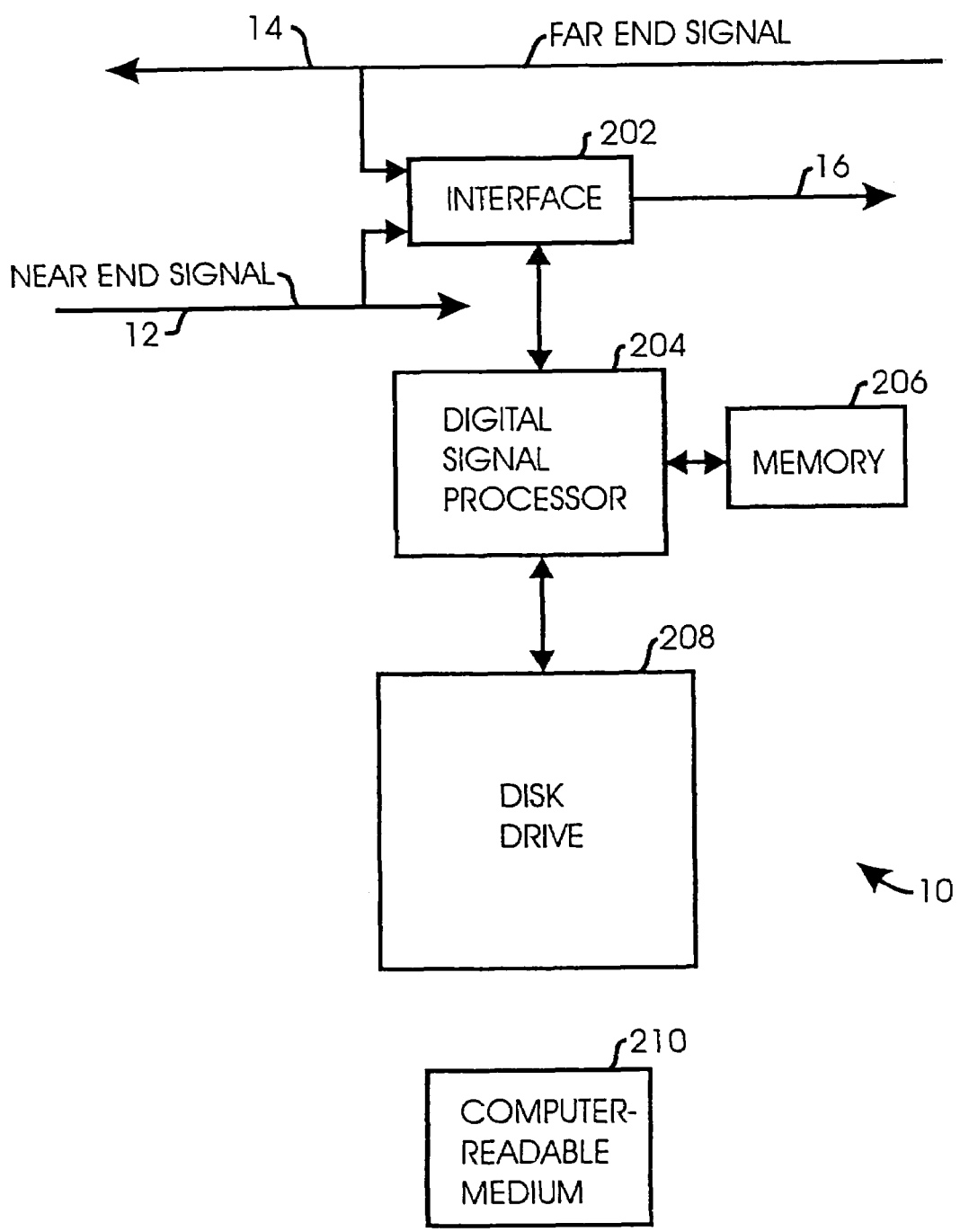
FIG. 6 is a schematic block diagram illustrating one embodiment of the invention using a digital signal processor and memory, which is loaded with a program through a computer readable medium and a drive.

One embodiment implementing the invention with a DSP 204 is illustrated in FIG. 6. An interface 202 receives communication signals embodying data from channels 12 and 14 and converts the signals to data useable by DSP 204. Such interfaces are known to those skilled in communication technology. A program for performing the functionality described in connection with FIG. 1 is stored in a memory 206, which may be any appropriate form of computer-readable medium. The program stored in memory 206 is executed by DSP 204 to perform the functionality. The program may be introduced to memory 206 through a conventional disk drive 208 connected to DSP 204. The program is stored on a computer-readable medium 210, such as a magnetic storage medium, including a floppy disk, or an optical storage medium, including a CD-ROM or a DVD disk. The program is read from the medium 210 by DSP 204 through drive 208 and is transferred to memory 206 by an operating system also stored in memory 206 in a known manner.

Analyzer 30 acts on the weakly compressed domain data created on paths 24, 27 and 28. Decoders 20 and 22 operate continuously whenever highly compressed domain data are present on channels 12 and 14. Metrics in the form of predetermined characteristics are gathered from both the near end data on channel 12 (the data to be processed) and the far end data on channel 14 (the other half of the conversation). The elements of block 30 include a Voice Activity Detector (VAD), long term and short term power meters, a DoubleTalk Detector (DTD) and spectral analysis processing (e.g., FFT or filter banks). Thus, the predetermined characteristics include voice activity, long term and short term power, double talk and spectral content. Other suitable metrics or characteristics could be added as necessary. Additionally, the output metrics are fed back to the analyzer. The output metrics represent the observable and expected benefit associated with enabling the particular AE enhancement feature, such as the enhanced decoded data generated by processor 50 or the enhanced data generated by processor 80.

The information gathered from the metrics or characteristics by analyzer 30 is used to determine the expected benefit of enabling the AE features performed by the processor complex 46. For example, in analyzer 30, the VAD, in combination with the DTD, can accurately identify the decoded data periods when near end speech is active, when an interfering echo signal is present, or when background noise is present. In addition, spectral measures, such as spectrum envelope or a pitch estimate, can be employed by analyzer 30 to classify and measure the decoded data. From these classifications and measures, the signal to noise ratio (SNR) is estimated. In addition, the residual echo power, overall signal power and signal spectral content of the data are estimated. Using the output metrics, characteristics such as the improvement in SNR or the Echo Return Loss Enhancement (ERLE) are also available to the analyzer.

Based on the data from the metrics or characteristics, a decision process is employed by analyzer 30 to determine the need for enabling the AE feature and which AE processing mode would be appropriate. In the case of highly compressed near end data, the order of preference is 1. The metrics or characteristics indicate speech data with little or no degradation. The AE processing is bypassed.
2. Minimal degradation is measured by analyzer 30. It is determined that the native mode AE is capable of sufficient signal improvement. Native mode AE is activated.
3. Significant data degradation is measured by analyzer 30 and determined not to be correctable by the native mode AE. Linear mode AE is activated.

For example, if the signal power is below or above nominal levels, native mode AE ALC is enabled in processor 80 to adjust the signal power on channel 12. As another example, if the SNR is below 18 dB, spectral measures indicate cancelable noise energy and minimal acoustical echo is detected, linear AE NR is enabled in processor 50 and switched into the decoded data path. Additionally, if the echo residual is large (for example, greater than −50 dBm), linear AE ACE is enabled in processor 50. For certain operations of processor functions 48, 50 and 80, such as echo cancellation, level control and ACE, the enhanced data on channel 16 are generated from the decoded data transmitted on both path 27 and path 28. Similar thresholds based on the metrics or characteristics of the decoded data can be devised for existing or proposed VBE features.

Conversely, the metrics or signal characteristics evaluated by analyzer 30 may indicate that an enabled AE feature is no longer needed or that conversion from native to linear mode (or vice-versa) is required. For example, assume that linear NR is active, and due to a change in call conditions, the SNR improves to be greater than 24 dB. In this case, NR is no longer needed and will be switched out by analyzer 30. Hysteresis is employed to minimize transitions.

The linear AE processing is similar to the VBE processing currently implemented in commercial products, with processing performed in the linear domain. Estimates gathered from the metrics or data characteristics processed by analyzer 30 are shared with the VBE features to minimize computational overhead. In addition, delay due to VBE processing is minimized.

Native mode AE processing, as discussed above, operates directly on the highly compressed domain speech data parameters. Due to the difficulty associated with processing in this domain, the native mode VBE algorithms are not as numerous or as sophisticated as the linear algorithms. For this reason, the metrics or data characteristics used by analyzer 30 determine not only if AE processing is necessary, but which version will meet the need. In summary, a preferred form of AE processing includes the following features:

1. A mode detector 15 detects the type of signal present on the near and far end signal paths (i.e., is the signal highly compressed or weakly compressed data?).
2. Mode detector 15 controls the decoders 20, 22. If the signal comprises highly compressed data, a decoding function is necessary to convert the data to lowly compressed domain data for use by the analyzer. This is independent of what type of AE processing is eventually applied. Optionally, the TFO highly compressed data (upper 6-bits of 8-bit lowly compressed PCM word are merged with the highly compressed data), the analyzer uses the abbreviated resolution 6-bits of PCM to determine the type of AE processing to apply.
3. There are processors for linear domain AE processing of lowly compressed data (processor 48), linear domain AE processing for highly compressed data (processor 50) and a processor for coded domain (or native domain) AE processing (processor 80). Note that the linear processing of highly compressed data requires the processed data to be decoded, processed and re-encoded. The native domain processor acts directly on the highly compressed data without requiring the decode and re-encode in the processing path. Additionally, for TFO signals processed by the native domain processor, the corresponding lowly compressed 6-bits of PCM must be likewise enhanced to track the enhanced highly compressed portion of the data. Attentively, the separate processors can be combined into a single processor.
4. Metrics are gathered by output metrics 90 and are sent to analyzer 30 to determine the best choice of AE feature. Analyzer 30 in combination with mode detector 15 control the application of the desired AE processing. Metrics include input and output metrics.
5. An optional delay buffer 13 provides transparency in the overall processing delay as either the input data changes its type (highly or weakly compressed) or AE features are enabled or disabled (native, linear or no AE processing). This buffer is described as optional since its use causes a higher processing delay in some modes. As a trade-off, this delay buffer does have the benefit of no delay pertubations from mode changes.
6. Based upon the mode detector 15 status and the result of the analysis of the metrics by analyzer 30, a certain type of AE processing is enabled.

In order to clarify how mode detector 15 and analyzer 30 choose the processing mode, various signal combinations and analyzer outputs are explained in detail below with the desired processing mode.

The types of signals detected by mode detector 15 are:
1. Highly compressed speech
2. Weakly compressed speech
3. TFO—a combination of highly compressed speech and abbreviated resolution lowly compressed speech.
4. A non-speech signal, such as inband signaling or a data transmission.

Analyzer 30 determines what level of AE processing is optimal from one of the following choices:
1. Native domain (also known as coded domain) processing is sufficient.
2. Traditional linear domain processing is preferred.
3. No AE processing is required. It has been determined that signal quality is such that artifacts introduced by the AE processing nullify any expected enhancements.

The possibilities listed above are organized into Table 1 below in order to clarify the conditions under which processing occurs:

embedded into the signal, and in fact these messages may be absent for a time, start-up and be present for a certain time, stop and then restart at some later time. All signal data types (highly compressed, weakly compressed and TFO) may contain such messages. A message processor 95, including a message extractor 96 and a message re-inserter 98, processes such messages (FIG. 1). Message extractor 96 extracts the embedded message bits and passes them to analyzer 30. Message extractor 96 is capable of extracting messages for the expected range of message frame formats (an example frame format is given in the ETSI standard GSM 08.62 "Digital cellular telecommunications system (Phase 2+); Inband Tandem Free Operation (TFO) of Speech Codecs"). Attentively, message extractor 96 may extract the embedded message bits in concert with mode detector 15. Analyzer 30 may examine the messages in order to determine state or status prior to passing the messages to message re-inserter 98. In order to take a more active role in the cellular negotiation process, analyzer 30 may also decide to alter or

TABLE 1

Mode Detector and Analyzer State with Type of AE Processing

| Case | Mode Detector Data Type | Enhancement Type | Processing Mode | Notes |
| --- | --- | --- | --- | --- |
| 1 | highly compressed | native domain | native domain processor 80 | Analyzer 30 looks at decoded data; Native domain processing algorithm executed by processor 80 may or may not look at decoded data but act directly on highly compressed data without decoding to carry out enhancement. |
| 2 | weakly compressed | native domain | linear domain processor 48 | No vocoding operations required. |
| 3 | TFO | native domain | linear and native domain processors 48 and 80 | Native mode processor 80 acts on highly compressed data portion; identical enhancement is applied to weakly compressed portion of data by processor 48. Decode functions are as for Case 1. |
| 4 | highly compressed | linear domain | linear domain processor 50 | The data must be decoded, then processed with the linear enhancement, followed by an encoder stage to return to the highly compressed domain. |
| 5 | weakly compressed | linear domain | linear domain processor 48 | No vocoding operations required. |
| 6 | TFO | linear domain | linear domain processor 50 | The highly compressed portion of the data is processed as in Case 4. The weakly compressed portion of the TFO data is available following enhancement process prior to the encoder process. This weakly compressed enhanced version of the data is merged with the highly compressed enhanced version of the data. |
| 7 | Any speech mode of cases 1-6 | None because quality of data is adequate | None | Input signal is unchanged. |
| 8 | Non-speech | N/A | None | Input signal is unchanged. |

Examples of native domain type enhancements are as follows: automatic level control, echo suppression, and noise reduction. Examples of linear domain type enhancements are as follows: automatic level control, echo cancellation, noise cancellation, and acoustic coupling reduction.

As noted earlier, inband messages may be embedded into the data signals 12 and 14. These messages are not always delete these messages. Message re-inserter 98 receives the message from analyzer 30 and embeds the message back into the post-processed data stream in channel 16. Message re-inserter 98 reinserts the message in a manner that is compliant with the underlying message frame structure and format.

Figure 2:
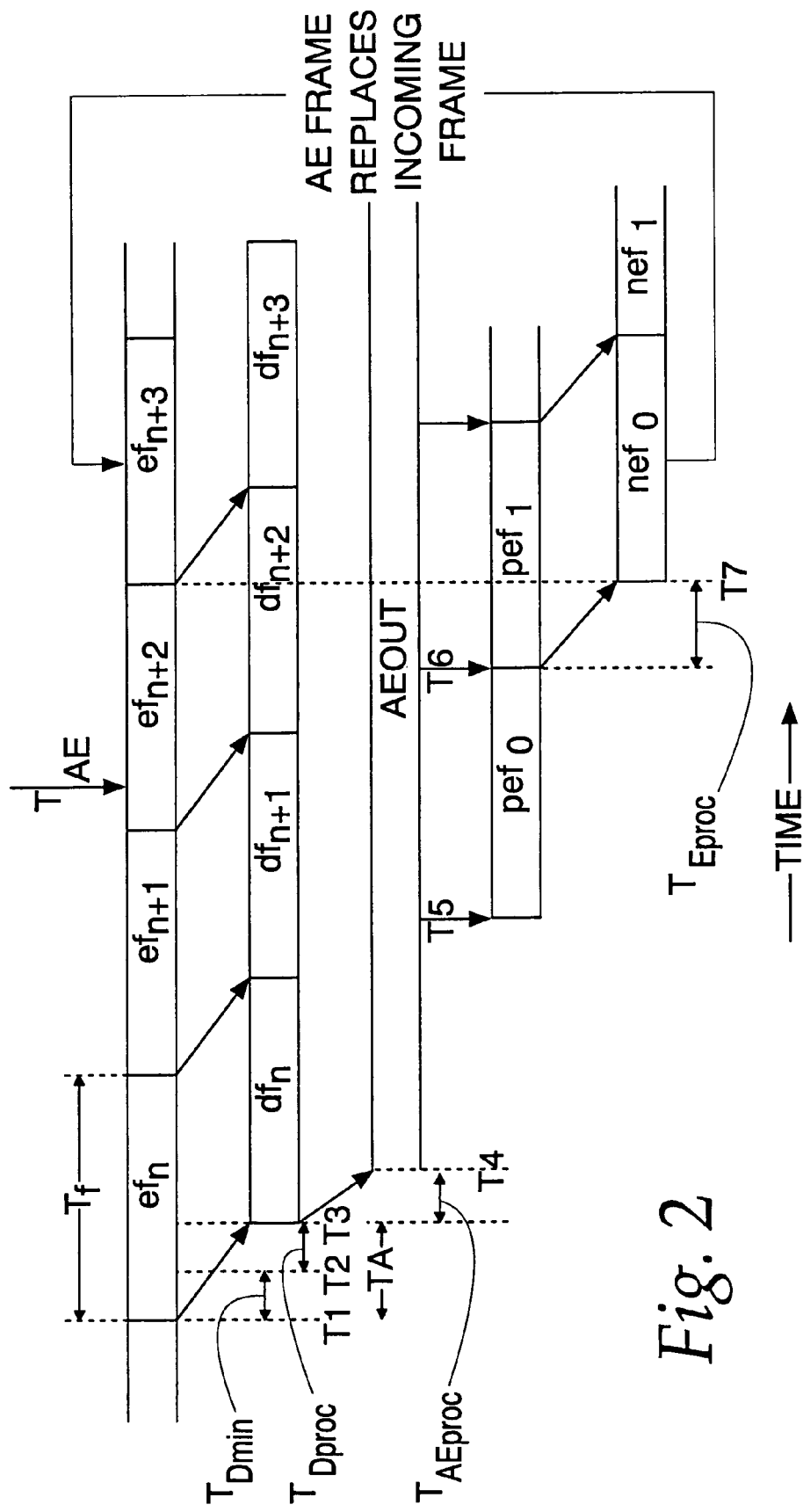
FIG. 2 is a timing diagram illustrating a preferred form of switch in buffer management during a first mode of operation of the apparatus shown in FIG. 1 in which time is shown on the horizontal axis.

When a linear AE feature for highly compressed domain data is switched-in and processor 50 begins to operate on the decoded data on path 28, there is an effect on the overall delay of the signal. This delay comes from several sources, as shown in FIG. 2.

The highly compressed domain signals in channels 12 and 14 (and the data represented by the signals) are organized into compressed domain data frames, such as frames $ef_n$, $ef_{n+1}$ and $ef_{n+2}$. To decode the data on channel 12, it is generally not necessary to collect an entire frame of data or signals (a frame is typically 20 msec and is shown in FIG. 2 as time period $T_f$); decoding can begin after the arrival of a portion of the data. Thus, if frame $ef_n$ begins at time T1, decoding begins at time T2. The time period between times T1 and T2 is represented in FIG. 2 by $T_{Dmin}$. There also is a delay due to the decoding processing by decoders 20 and 22 denoted $T_{Dproc}$ which occurs between times T2 and T3. Thus, decoded data begins at time T3 after time period TA. Encoder 60 requires an entire frame of data to compute the enhanced highly compressed encoded data. In addition, there is delay due to the encoder 60 processing time ($T_{Eproc}$) and the delay associated with the AE feature ($T_{AEproc}$) of processor function 50. Therefore, the minimum possible delay is the sum of one frame ($T_f$), $T_{Dmin}$, $T_{Dproc}$, $T_{Eproc}$ and $T_{AEproc}$.

One embodiment includes a method to reduce the processing delay when the input data is highly compressed and linear AE processing is applied. This method involves redefining the boundaries of the highly compressed vocoder frames.

Figure 3:
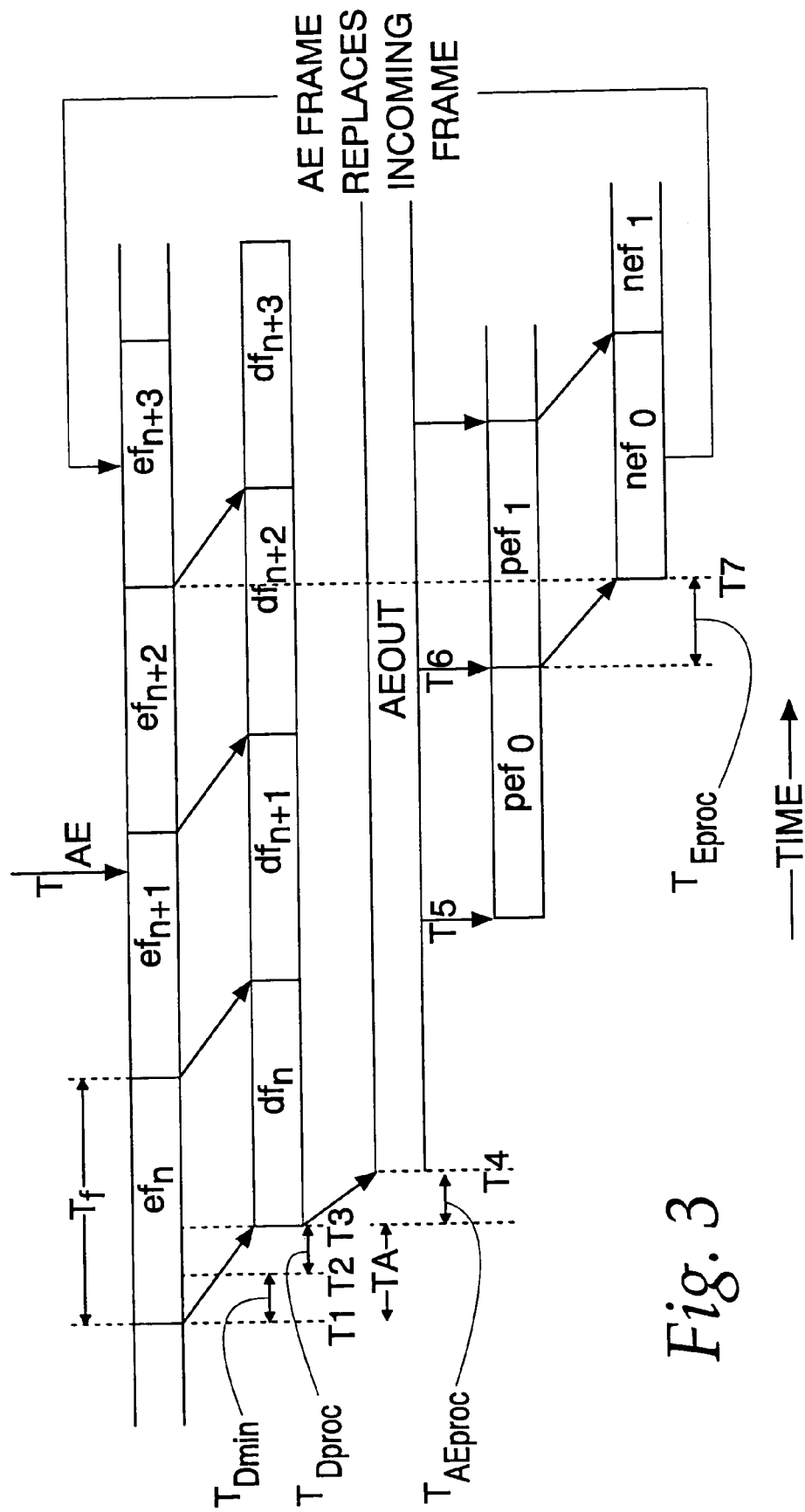
FIG. 3 is a timing diagram illustrating a preferred form of switch in buffer management during a second mode of operation of the apparatus shown in FIG. 1 in which time is shown on the horizontal axis.

In general, the frame boundaries are redefined as follows:
1. Highly compressed speech data is divided into frames. For linear processing, these frames are decoded into what is conveniently interpreted as an unframed linear speech stream. Following AE enhancement and prior to re-encoding, boundaries of the previously decoded highly compressed speech frames are redefined. Moving the boundaries and re-encoding based on these new boundaries reduces the overall processing delay. A preferred form of this process is shown in FIG. 2.
2. The case where the decision to switch in the linear AE feature occurs late in a frame is illustrated in FIG. 3.
3. There is also a preferred method to disable an AE feature (i.e., switch from linear processing to native processing or none) illustrated in FIG. 4.
4. The best time to switch in and out linear AE processing is during periods when the speaker is not active (i.e., the speaker is either paused or listening). Preferably, a VAD determines when this time occurs.
5. An optional delay buffer to smooth over processing transitions may be used.
6. As noted earlier, the highly compressed speech frames may encapsulate message and control information between network equipment (for example, the TFO standard describes this message technique). Message extractor 96 strips out the control messages prior to any redefinition of highly compressed frames. Message re-inserter 98 re-inserts the control messages into the newly redefined highly compressed frames.

In order to achieve the minimum delay, it is necessary to redefine the frame boundaries. As shown in FIG. 2, compressed domain frame $ef_n$ is decoded into linear frame $df_n$. Concatenated decoded frames are interpreted as a linear speech data stream, with no implicit boundaries. Following AE processing, the enhanced linear speech data stream is shown as the sequence AEOUT. Buffer 40 stores enough of sequence AEOUT to correspond to a few of frames $ef_i$. The processing time required to compute the enhancement is denoted as $T_{AEproc}$. Therefore, the enhanced linear data is available at time T4. At time $T_{AE}$, based on the metric results (i.e., the decision of analyzer 30), the decision is made to enable an AE feature and thus it is desired to replace the data on channel 12 with the enhanced data. The frame boundaries are then redefined in order to achieve the minimum possible delay. As a result, the first AE processed frame output, $nef_0$, which replaces input frame $ef_{n+3}$, is actually composed of elements from frames $ef_{n+1}$ and $ef_{n+2}$. Therefore, a portion of the data is repeated, but this portion is minimized.

In order to achieve this result, frame encoder 60 accesses buffer 40 over path 44 to concatenate portions of the enhanced data stream AEOUT which occurred between times T5 and T6, into a new pre-encoded frame $pef_0$ which is transmitted to encoder 60 over path 42. In general, frames $pef_i$ (e.g., frames $pef_0$ and $pef_1$) are enhanced linear speech frames. The boundaries of these frames are chosen such that their time alignment allows encoding into highly compressed domain format such that the resulting data is available when required. Frames $nef_i$ (e.g., frames $nef_0$ and $nef_1$) are new highly compressed domain encoder frames resulting from encoding of $pef_i$ frames (e.g., frames $pef_0$ and $pef_1$, respectively). Frames nef replace the incoming $ef_i$ frames so that the data includes AE processing.

Time $T_{AE}$ occurs during frame $ef_{n+2}$. Therefore it is desirable to replace incoming frame $ef_{n+3}$ with an AE processed frame. Since time is required to execute the encoder ($T_{Eproc}$), the linear speech frame boundaries are redefined such that $nef_0$ is exactly ready when it is needed to replace frame $ef_{n+3}$. This is how the data for frame $pef_0$ is chosen. In other words, the end of the time period represented by frame $pef_0$ (time T6) is selected so that the time period between T6 and the beginning of the target replacement frame (frame $ef_{n+3}$), time T7, equals the time period required for encoder processing ($T_{Eproc}$). $Nef_0$ is based on data from portions of $ef_{n+1}$, and $ef_{n+2}$, so portions of the data are repeated, but this represents a minimal amount of repetition and time. This repetition occurs only once when switching to this mode of operation and is generally not noticeable.

Encoder function 60 begins processing frame $pef_0$ at time T6 to form encoded frame $nef_0$. Due to the delay during time period $T_{Eproc}$, enhanced and encoded data do not appear in frame $nef_0$ until time T7. However, at time T7, the enhanced frame $nef_0$ replaces frame $ef_{n+3}$ in order to minimize processing and encoding delays.

When $T_{AE}$ occurs so late in frame $ef_{n+1}$ that there is insufficient time to replace the next incoming frame $ef_{n+2}$, as shown in FIG. 3, then the first frame replaced is frame $ef_{n+3}$, even though the $T_{AE}$ signal occurs more than one frame prior to frame $ef_{n+3}$ (i.e., late during frame $ef_{n+1}$).

Based on the examples of FIGS. 2 and 3, the preferred embodiment follows a general rule that once a decision to switch in the AE features is made, the next possible frame which can be replaced is processed. In some cases, this may be the next frame (i.e., when $T_{AE}$ occurs early in an incoming frame) or two frames later (when $T_{AE}$ occurs later in a frame). The frame to be replaced depends on the time period from $T_{AE}$ until the beginning of the next frame: if the time period is at least $T_{Eproc}$, the next frame can be replaced; if it is not, replacement starts two frames later. Alternatively, we can delay the switching decisions so that $T_{AE}$ will occur near the beginning of a frame. Another possibility is to always make switching decisions only at a predetermined point in the $ef_1$ frame boundary so that $T_{AE}$ is near the beginning of a frame; a similar approach can also be used for switching out the linear AE processing.

Figure 4:
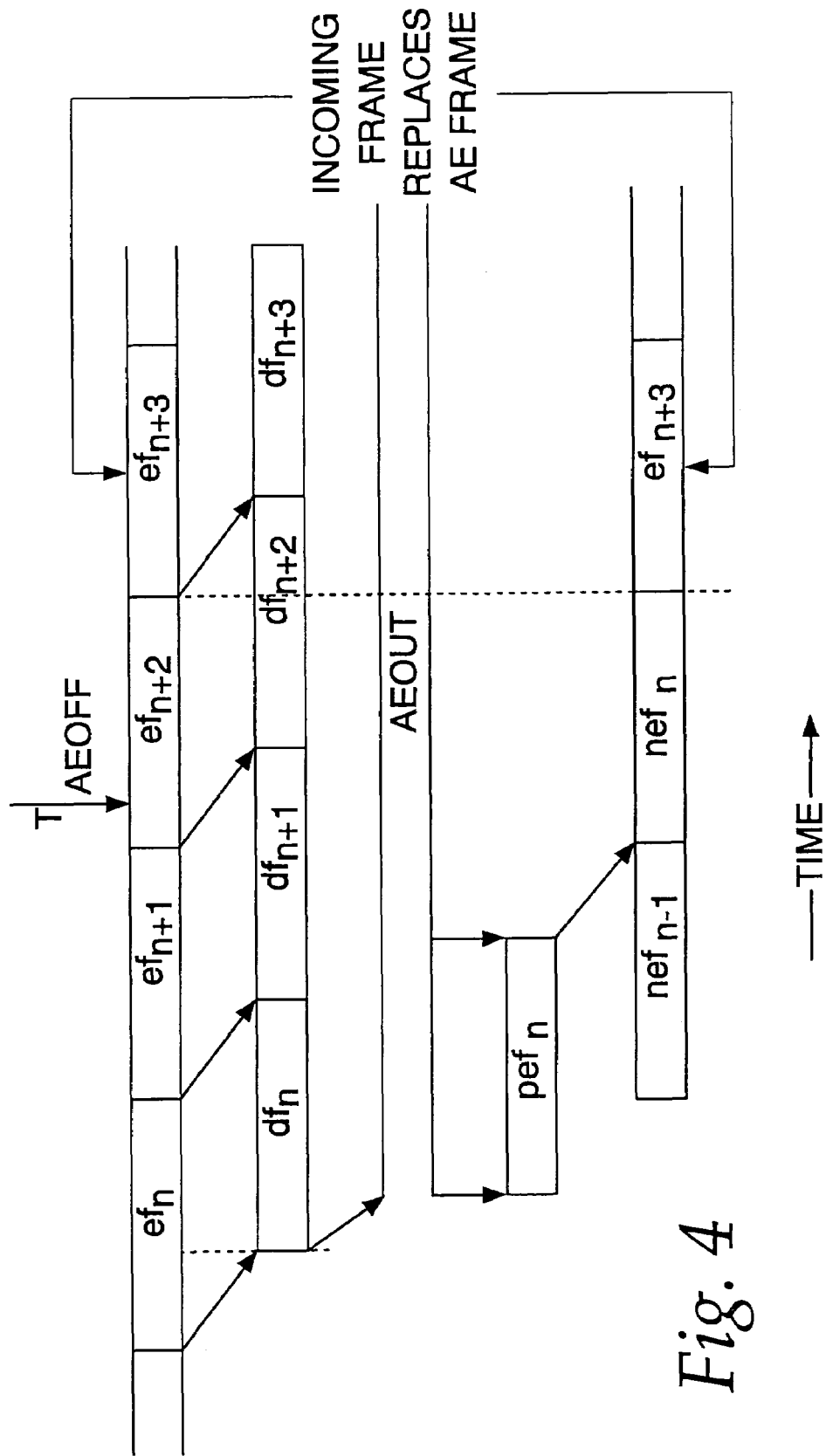
FIG. 4 is a timing diagram illustrating a preferred form of switch out buffer management of the apparatus shown in FIG. 1 in which time is shown on the horizontal axis.

FIG. 4 illustrates the preferred procedure for switching out the AE features. In the example of FIG. 4, at time $T_{AEoff}$, it is determined that the benefits of the AE processing are no longer needed and, therefore, the AE processing and associated delay need to be switched out. The current output frame $nef_n$ (at time $T_{AEoff}$) is derived from data extracted from compressed domain frames $ef_n$ and $ef_{n+1}$. Following the switch off, the frame following $nef_n$ is replaced with the incoming, unmodified compressed domain frame $ef_{n+3}$. Switch 70 (FIG. 1) switches states at the frame boundary and the next output frame is $ef_{n+3}$. This removes any unnecessary delay, but the signal represented in a portion of $ef_{n+1}$ and all of $ef_{n+2}$ is lost. This is not a serious problem since these transitions happen infrequently, usually at the start or end of a call.

Referring to FIG. 1, the analyzer 30 may time transitions between the various processor functions of processor 46. Analyzer 30 typically includes VAD(voice activity detection). A transition between any of the processing modes can be timed to occur when the VAD state is speech not active or during a hangover period between voice syllables. This makes the processing mode transition less noticeable to the phone user. For example, linear AE processing can be enabled and disabled during periods when a speech signal is absent.

An alternative approach to managing the changes in signal delay is to use the optional delay buffer 13 shown in FIG. 1. The amount of delay inserted by the delay buffer is recommended to be set at the minimum possible delay minus the delay associated with the AE processing, which is the sum of one frame ($T_f$), $T_{Dmin}$, $T_{Dproc}$, and $T_{Eproc}$. When processors 48 or 80 are active, the near end data on channel 12 is first passed through the optional delay buffer 13. When processor 50 is active, the near end data is passed through the decoder function 20 and not the optional delay buffer 13. The repeating or skipping of data samples due to transitions in modes would be avoided. In the transition from native mode processing to highly compressed domain linear VBE processing, as the signal from the native mode process runs out, the signal from the linear VBE process would be exactly ready. A similar argument follows the opposite transition.

For native mode AE executed by processor 80, the delay is due to the processing of the AE feature. This delay typically is less than a speech frame and therefore creates no processing delay issue.

The AE processing system may be deployed in either mobile to PSTN or mobile to mobile network topologies. Often, AE systems are installed in a duo configuration in order to offer bidirectional enhancement. This configuration is ideal for mobile to PSTN calls since there is only one instance of AE processing in each path. For mobile to mobile calls, the AE processing is duplicated in each path, and hence the AE features appear in tandem. In this case, tandem AE is sensed and one half of the AE processing is suspended.

Figure 5:
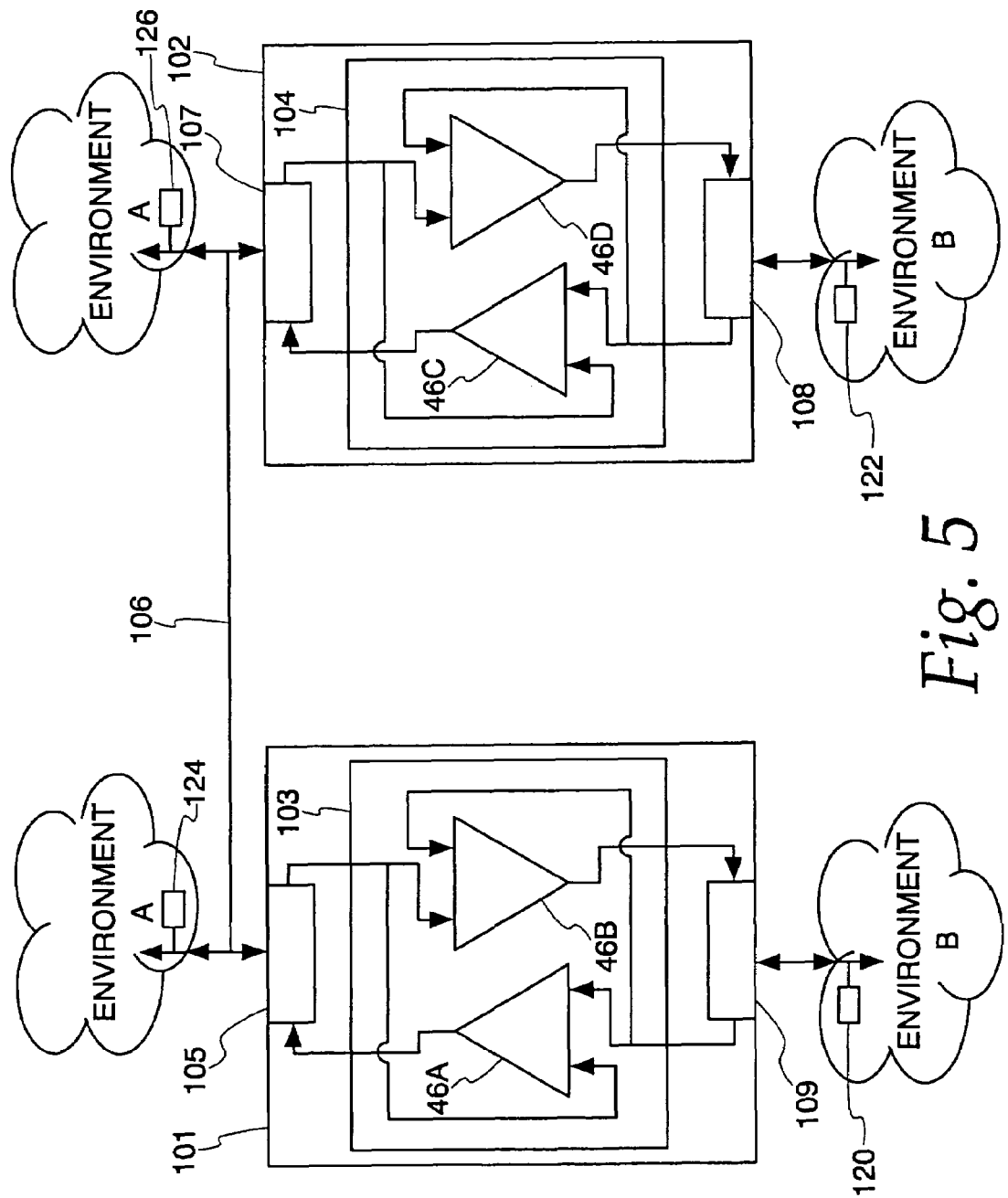
FIG. 5 is a schematic block diagram illustrating an exemplary duo processing form of the invention.

FIG. 5 illustrates the mobile environment in which AE Duo Processing is applied. In practice, Environment B is the mobile side of the call that includes telephones, such as 120 and 122, and Environment A is the PSTN (Public Switched Telephone Network) side of the call that includes telephones, such as 124 and 126. AE Duo processing provides duplex speech enhancement processing. Switches 101 and 102 control the call depending on the type of connection and the necessary routing between mobile and PSTN environments.

Consider a call from a mobile subscriber using phone 120 to a land based phone 124 (a mobile to PSTN call) through Switch 101. In order to provide AE processing in both the mobile to PSTN direction as well as the PSTN to mobile direction, AE Duo Processors 103 and 104 offer duplex processing. Within switch 101, duo Processor 46A supplies AE features in the PSTN to mobile direction, while Duo Processor 46B supplies AE features in the opposite mobile to PSTN direction. Each processor has access to the main signal, as well as the co-processed signal for AE features which require this type of enhancement. The same processing capability is supplied by duo processors 46C and 46D within switch 102. Each of processors 46A-46D is identical to the processing system shown in FIG. 1. Switch 101 includes conventional input/output (I/O) buffers 105 and 109, and switch 102 includes conventional input/output (I/O) buffers 107 and 108.

In reference to FIG. 1, a mobile to PSTN connection would employ processor function 48. In the mobile to PSTN environment, the signals are in a PCM compressed linear format.

Consider the case of a mobile to mobile call (i.e., an Environment B to Environment B call routed through Switches 101 and 102 over a path 106) between telephones 120 and 122. In this case, AE features are tandemed together. The call direction through Switch 101 and then through Switch 102 from phone 120 to phone 122 is processed first by Duo AE Processor 46A and then processed by Duo AE Processor 46D. The enhancement offered by Duo AE Processor 46A supplies the vast majority of improvement in the quality of the speech signal, and the tandeming with AE Processor 46D can degrade the call quality. Therefore, in the example given, switch 101 disables AE processing by processor 46A or switch 102 disables AE processing by processor 46D. The same is true for the opposite call direction from phone 122 to phone 120 through Switch 102 processed by Duo AE Processor 46C and then through Switch 101 with tandem processing by Duo Processor 46B. In that example, switch 101 disables AE processing by processor 46B or switch 102 disables AE processing by processor 46C. Switches 101 and 102 may comprise hardware or software switches.

Therefore, in the case of mobile to mobile calls, tandem AE processing is suspended. The switches 101 and 102 control the enabling of the AE processing: for mobile to PSTN calls, AE Duo Processing is enabled while for mobile to mobile calls, AE Duo Processing is disabled and AE Processing reverts to be a simplex mode (one-side of the processing, either a-side processing or b-side processing, is disabled).

Referring to FIG. 1, processor functions 50 and 80 are used for the mobile to mobile case when the communication signals used in environment B are in the compressed domain format, employed in TFO, and supply simplex directional processing.

Due to negotiations or handovers, dropouts of the transmission of compressed data in the mobile to mobile case occur and the signal reverts back to a PCM compressed linear format. The AE processors recognize these dropouts of the compressed domain, and although the processing reverts to processor function 48 of FIG. 1, simplex directional processing is still maintained. This is in contrast to the normal case of employing processor function 48, where usually processor function 48 is activated with duplex processing. In the case of compressed domain dropouts, processor function 48 is employed in a simplex directional mode to avoid tandem enhancement.

The benefits of employing simplex processing in a mobile to mobile environment include:

(1) avoiding detrimental effects of tandem processing;
(2) reducing processing delays; and
(3) reducing computational load in mobile-to-mobile cases.

Those skilled in the art will recognize that the preferred embodiment may be altered and modified without departing from the true spirit and scope of the invention as defined in the accompanying claims.

What is claimed is:

1. An apparatus for enhancing the quality of communications signals, the apparatus comprising:
    a mode detector to determine a first compression level of original data in a communications signal, the first compression level being within either a highly compressed range or a weakly compressed range, the highly compressed range having compression levels greater than the weakly compressed range;
    a decoder to decode the original data to form decoded data having a second compression level within the weakly compressed range;
    an analyzer to determine whether the original data is suitable for traditional audio enhancement processing in an event the first compression level is within the highly compressed range;
    an enhancement processor to perform traditional audio enhancement processing on the decoded data to form enhanced decoded data in the event the original data is suitable for traditional audio enhancement processing; and
    an encoder to encode the enhanced decoded data to form enhanced encoded data having a compression level within the highly compressed range in the event the original data is suitable for traditional audio enhancement processing.

2. An apparatus as in claim 1 wherein the traditional audio enhancement processing includes linear voice band enhancement.

3. An apparatus as in claim 1 wherein the analyzer determines whether the original data is suitable for traditional audio enhancement processing based on the decoded data.

4. An apparatus as in claim 1 wherein the enhancement processor performs traditional audio enhancement processing on the original data in an event the first compression level is within the weakly compressed range.

5. An apparatus as in claim 1 wherein the mode detector determines the first compression level of the original data by searching the original data for framing patterns.

6. An apparatus as in claim 1 further comprising:
    an output metrics module to gather output metrics based on the traditional audio enhancement processing; and
    wherein the analyzer determines whether the original data is suitable for traditional audio enhancement based on the output metrics.

7. An apparatus as in claim 6 wherein the output metrics represent a quantification of an amount of deliverable audio enhancement.

8. An apparatus as in claim 6 wherein the analyzer determines whether the original data is suitable for traditional audio enhancement processing based on a benefit associated with performing traditional audio enhancement processing.

9. An apparatus as in claim 1 wherein the analyzer determines whether the original data is suitable for native mode audio enhancement processing in the event the first compression level is within the highly compressed range; and
    wherein the enhancement processor performs native mode audio enhancement processing on the original data in an event the original data is suitable for native mode audio enhancement processing.

10. An apparatus as in claim 9 further comprising:
    an output metrics module to gather output metrics based on the native mode audio enhancement processing; and
    wherein the analyzer determines whether the original data is suitable for native mode audio enhancement based on the output metrics.

11. A method of enhancing the quality of communications signals, the method comprising:
    determining a first compression level of original data in a communications signal, the first compression level being within either a highly compressed range or a weakly compressed range, the highly compressed range having compression levels greater than the weakly compressed range;
    decoding the original data to form decoded data having a second compression level within the weakly compressed range;
    determining whether the original data is suitable for traditional audio enhancement processing in an event the first compression level is within the highly compressed range;
    in an event the first compression level is within the highly compressed range and the original data is suitable for traditional audio enhancement processing, performing traditional audio enhancement processing on the decoded data to form enhanced decoded data and encoding the enhanced decoded data to form enhanced encoded data having a compression level within the highly compressed range.

12. A method as in claim 11 wherein the traditional audio enhancement processing includes linear voice band enhancement.

13. A method as in claim 11 wherein determining whether the original data is suitable for traditional audio enhancement processing includes determining whether the original data is suitable for traditional audio enhancement processing based on the decoded data.

14. A method as in claim 11 further comprising:
    performing traditional audio enhancement processing on the original data in an event the first compression level is within the weakly compressed range.

15. A method as in claim 11 wherein determining the first compression level of the original data includes searching the original data for framing patterns.

16. A method as in claim 11 further comprising:
    gathering output metrics based on the traditional audio enhancement processing; and
    wherein determining whether the original data is suitable for traditional audio enhancement processing includes determining whether the original data is suitable for traditional audio enhancement processing based on the output metrics.

17. A method as in claim 16 wherein gathering the output metrics includes quantifying an amount of deliverable audio enhancement.

18. A method as in claim 16 wherein determining whether the original data is suitable for traditional audio enhancement processing based on the output metrics includes determining a benefit associated with performing traditional audio enhancement processing.

19. A method as in claim 11 further comprising:
determining whether the original data is suitable for native mode audio enhancement processing in the event the first compression level is within the highly compressed range; and
performing native mode audio enhancement processing on the original data in an event the first compression level is within the highly compressed range and the original data is suitable for native mode audio enhancement processing.

20. A method as in claim 19 further comprising:
gathering output metrics based on the native mode audio enhancement processing; and
wherein determining whether the original data is suitable for native mode audio enhancement processing includes determining whether the original data is suitable for native mode audio enhancement processing based on the output metrics.

21. A computer readable medium having computer readable program codes embodied therein for enhancing the quality of communications signals, the computer readable medium program codes including instructions that, when executed by a processor, cause the processor to:
determine a first compression level of original data in a communications signal, the first compression level being within either a highly compressed range or a weakly compressed range, the highly compressed range having compression levels greater than the weakly compressed range;
decode the original data to form decoded data having a second compression level within the weakly compressed range;
determine whether the original data is suitable for traditional audio enhancement processing in an event the first compression level is within the highly compressed range; and
in an event the first compression level is within the highly compressed range and the original data is suitable for traditional audio enhancement processing, perform traditional audio enhancement processing on the decoded data to form enhanced decoded data and encode the enhanced decoded data to form enhanced encoded data having a compression level within the highly compressed range.

22. An apparatus for enhancing the quality of communications signals, the apparatus comprising:
means for determining a first compression level of original data in a communications signal, the first compression level being within either a highly compressed range or a weakly compressed range, the highly compressed range having compression levels greater than the weakly compressed range;
means for decoding the original data to form decoded data having a second compression level within the weakly compressed range;
means for determining whether the original data is suitable for traditional audio enhancement processing in an event the first compression level is within the highly compressed range; and
means for, in an event the first compression level is within the highly compressed range and the original data is suitable for traditional audio enhancement processing, performing traditional audio enhancement processing on the decoded data to form enhanced decoded data and encoding the enhanced decoded data to form enhanced encoded data having a compression level within the highly compressed range.

* * * * *